US005191910A

United States Patent [19]

Eaton et al.

[11] Patent Number: 5,191,910

[45] Date of Patent: Mar. 9, 1993

[54] METHOD AND APPARATUS FOR CONTINUOUS LIQUEFACTION OF GELLED PHOTOGRAPHIC MATERIALS

[75] Inventors: Donald E. Eaton; James K. Toner; Daniel J. Wooster, all of Rochester, N.Y.

[73] Assignee: Eastman Kodak Company, Rochester, N.Y.

[21] Appl. No.: 613,422

[22] Filed: Nov. 14, 1990

[51] Int. Cl.[5] ..... F16K 49/00

[52] U.S. Cl. ..... 137/2; 137/341; 137/565; 165/120

[58] Field of Search ..... 165/120; 137/334, 341, 137/2, 565

[56] References Cited

U.S. PATENT DOCUMENTS

| | | | |
|---|---|---|---|
| 827,057 | 7/1906 | Campbell et al. | 165/120 |
| 1,859,450 | 5/1932 | Marshall | 165/120 |
| 2,900,239 | 8/1959 | Speed et al. | 165/120 |
| 3,017,289 | 1/1962 | Miller et al. | 117/34 |
| 3,779,518 | 12/1973 | Koepke et al. | 137/571 |
| 3,810,778 | 5/1974 | Wang | 117/34 |
| 3,847,616 | 11/1974 | Kaneko et al. | 96/94 R |
| 4,299,559 | 11/1981 | Shimizu et al. | 432/13 |
| 4,334,884 | 6/1982 | Wilke et al. | 137/2 |
| 4,673,782 | 6/1987 | Koepke et al. | 219/10.55 M |
| 4,844,766 | 7/1989 | Held | 165/120 |

FOREIGN PATENT DOCUMENTS

| | | |
|---|---|---|
| 3406600 | 2/1984 | Fed. Rep. of Germany . |
| 89/0016 | 12/1990 | PCT Int'l Appl. . |
| 1060620 | 12/1983 | U.S.S.R. . |
| 787336 | of 0000 | United Kingdom . |
| 1325390 | 8/1973 | United Kingdom . |

OTHER PUBLICATIONS

Derwent Abstract D0009A/15-Appts. for Melting Photographic Emulsion Oct. 1977.

Derwent Abstract 67181 C/38-Photographic Emulsion Melter and Spreader Jan. 1980.

Derwent Abstract 12399X/07-Melting Gelated Gelatin Emulsion Jan., 1976.

*Primary Examiner*—A. Michael Chambers

*Attorney, Agent, or Firm*—William T. French; Joshua G. Levitt; Michael L. Goldman

[57] ABSTRACT

A method and apparatus for continuously liquefying a gelled photographic material for coating on a substrate is disclosed. The material is advanced throughout the liquefaction apparatus and on to the substrate coating system as a substantially undisrupted mass. The technique is particularly useful for liquefying small amounts of material at a time, because system hold-up volume and waste is minimized.

17 Claims, 3 Drawing Sheets

METHOD AND APPARATUS FOR CONTINUOUS LIQUEFACTION OF GELLED PHOTOGRAPHIC MATERIALS

FIELD OF THE INVENTION

This invention relates to a method and apparatus for liquefying gelled substances, and in particular to a method for continuous liquefaction of gelled photographic materials.

BACKGROUND OF THE INVENTION

In the course of their production, photographic materials are typically chilled and stored in the gelled state following preparation in order to prevent qualitative degradation. It is then necessary to liquefy the gelled materials so they can be coated on a film or paper support. Gelled photographic materials include aqueous or solvent based photosensitive or non-photosensitive emulsions or dispersions.

Two general methods for liquefying gelled photographic materials are known.

In the batchwise method, gelled photographic material is loaded into a tank which is fitted with a stirring means. Heat is provided to the exterior of the tank, while the material is stirred inside. All of the material in the tank is melted at one time, and then drawn off as needed.

The batchwise method has serious drawbacks, because an entire batch of gelled material is melted at a time, causing individual increments of gel to be overheated. The result is qualitative degradation of the material and varying sensitometry along the length of the coated film.

Alternatively, the gelled material may be continuously liquefied by any of several known methods. In one such continuous liquefaction method, the gelled material is loaded into a hopper, pumped from the hopper into a vacuum drum where entrapped air is removed, and then pumped into a heat exchanger. The material is melted in the heat exchanger and conveyed to a surge pot, from which it is delivered to a coating apparatus.

Several disadvantages are associated with the use of this method, however. The vacuum drum is needed to remove air which enters the system through the upstream pump system. Unfortunately, the presence of the vacuum drum causes material discharged from the downstream pumping system to flow back toward the vacuum drum. As a result, large pressure surges occur downstream of the vacuum drum. These conditions necessitate the use of the surge pot to dampen pulsations prior to delivery to the coating apparatus. However, the vacuum drum and surge pot increases the size and hold-up volume of the apparatus, resulting in excessive waste of material and difficult and time-consuming cleaning procedures. In addition, this method is useless for liquefying small amounts of material, because the entire length of the system must be filled with material in order to operate. Achieving and maintaining sufficient vacuum in the vacuum drum is another concern associated with this method. Also, the pumps used in this system tend to impart unacceptably high shear levels to the gelled material which causes unacceptable sensitometry degradation.

SUMMARY OF THE INVENTION

The present invention relates to a method and apparatus for continuously liquefying gelled photographic materials. In this method, gelled photographic material is conveyed to a positive displacement pump. Such conveyance is effected by a conveyor which always keeps the spaces swept by the pump rotors full of material. The positive displacement pump discharges the material into a heat exchanger where it is liquefied and then conveyed to a coating line.

The maintenance of a constant capacity volume of material in the positive displacement pump significantly reduces air uptake in the system and eliminates the pressure perturbations which plagued the prior method. As a result, the vacuum chamber and surge pot may be eliminated, and only one conveyor and positive displacement pump are required. The apparatus required is much simpler and smaller than that of the prior method. As a result of the reduced hold-up volume, less material is wasted, small runs are easier and economically feasible, and the apparatus is significantly easier to clean. More importantly, due to stress reduction, the material is less likely to suffer qualitative degradation with the method of the present invention.

DETAILED DESCRIPTION OF THE DRAWINGS

Figure 1:
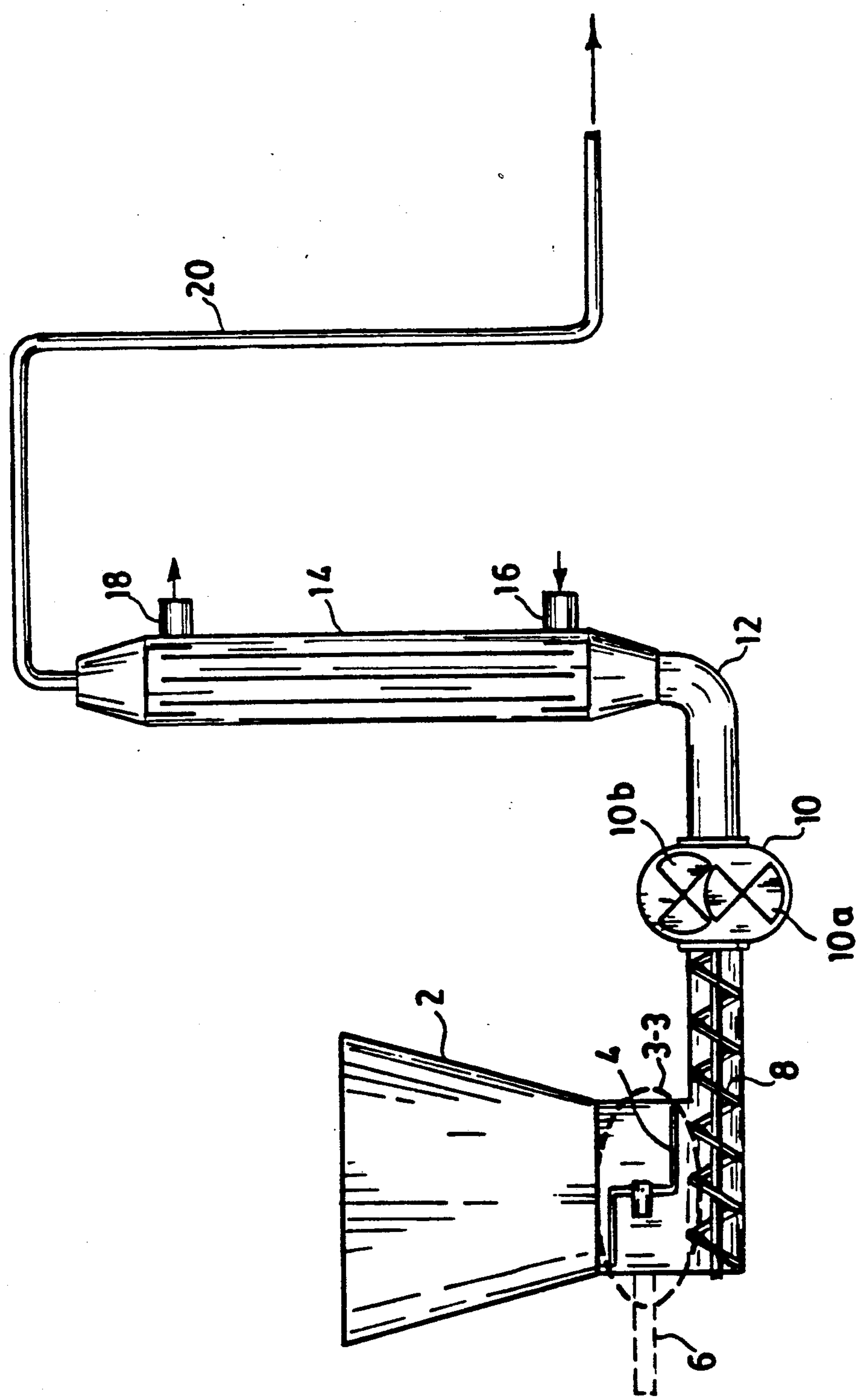
FIG. 1 is a schematic view of a system for continuously liquefying gelled photographic material in accordance with a preferred embodiment of the invention.

In the embodiment of the invention depicted in FIG. 1, chilled granular or chunked photographic material, such as silver halide gelatin emulsion, is added to hopper 2 by any suitable method. Hopper 2 may be fitted with line 6 having a valve (not shown) for selective connection to a source of vacuum, preferably at a level of 0 to 10 PSIA.

Figure 3:
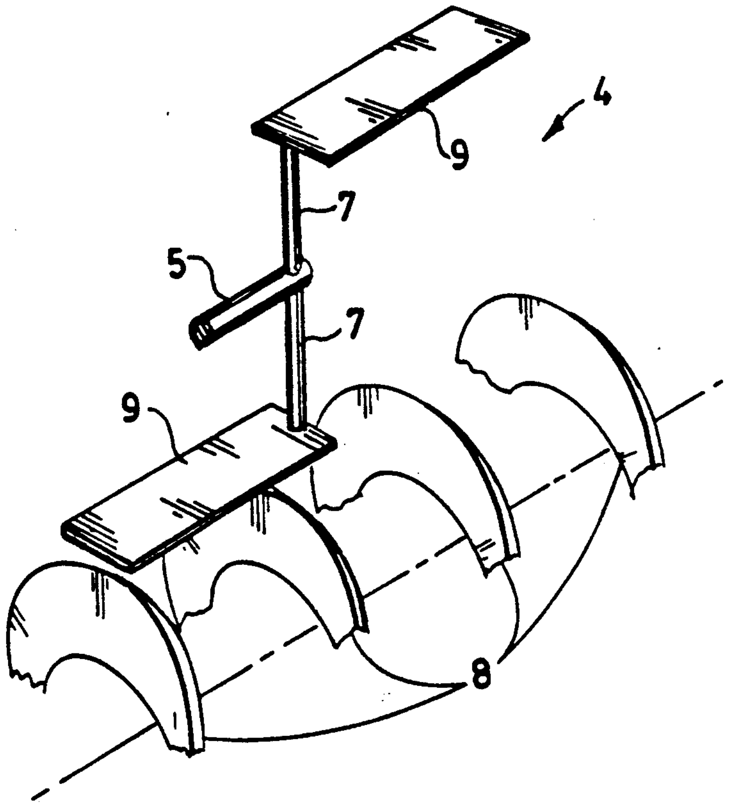
FIG. 3 is a perspective view of the invention of the invention of FIG. 1 as viewed from the dashed elliptical area 3—3.

As shown in FIG. 3, which is a perspective view of the invention of FIG. 1 as viewed from the dashed elliptical area 3—3, bridge breaker 4 is positioned at the bottom of hopper 2. Bridge breaker 4 ensures continuous conveyance of material to the pump by sweeping over conveyor 8, to prevent material in hopper 2 from bridging over conveyor 8 and not filling the flights of conveyor 8 with gelled material. Rotation of paddles 9 of bridge breaker 4 is driven by a motor (not shown) connected to drive shaft 5. Drive shaft 5 rotates rods 7 connected to paddles 4. By keeping conveyor 8 filled with gelled material, bridge breaker 4 insures that the relative percentages of gelled material and air in the void spaces between the gelled material are substantially constant. This ensures that the ultimately liquefied gel has a low and substantially constant air content, typically 0 to 10%, preferably 0%.

Conveyor 8, preferably a screw conveyor, is directly connected with and provides a continuous supply of material to positive displacement pump 10, so that the spaces swept by rotors 10*a* and 10*b* of positive displacement pump 10 are kept constantly filled with material.

This requires that screw conveyor 8 advance material at a flow rate at least as great as that of positive displacement pump 10. A screw conveyor capable of generating about 137.8-543.2 kPA (i.e., 20-80 PSI) at the inlet of positive displacement pump 10 (e.g., K-TRON Model S-500 screw auger feeder manufactured by K-TRON Corp., Glassboro, N.J.) will achieve this. By positive displacement pump, we mean a pump which continuously advances material at a substantially constant volumetric rate without substantial backflow. For the liquefaction of silver halide gelatin emulsions, this pump does not impart shear levels which will unacceptably degrade the sensitometry of the coated product. A positive displacement pump which is especially suited for practicing the method of the present invention is a standard model 15U Waukesha rotary pump, manufactured by Waukesha Division, Abex Corp., Waukesha, Wis., with standard twin-wing rotors.

Screw conveyor 8 acts in conjunction with positive displacement pump 10 to advance a substantially undisrupted mass of material from positive displacement pump 10 through connection 12 into heat exchanger 14. Hot water or other suitable heat exchange fluid is supplied to heat exchanger 14 through inlet 16 and discharged from outlet 18. In heat exchanger 14, which is preferably of shell and tube design, material is preferably heated to a temperature of about 32° C. to 100° C., slightly above the coating temperature of 30° to 55° C., preferably 40° C.

Positive displacement pump 10 advances a substantially undisrupted mass of gelled material into heat exchanger 14 causing the material liquefied in heat exchanger 14 to continue advancing through conduit 20 to a substrate coating system (not shown) as a continuous mass. The substrate coating system may include in-line air removal apparatus.

Figure 2:
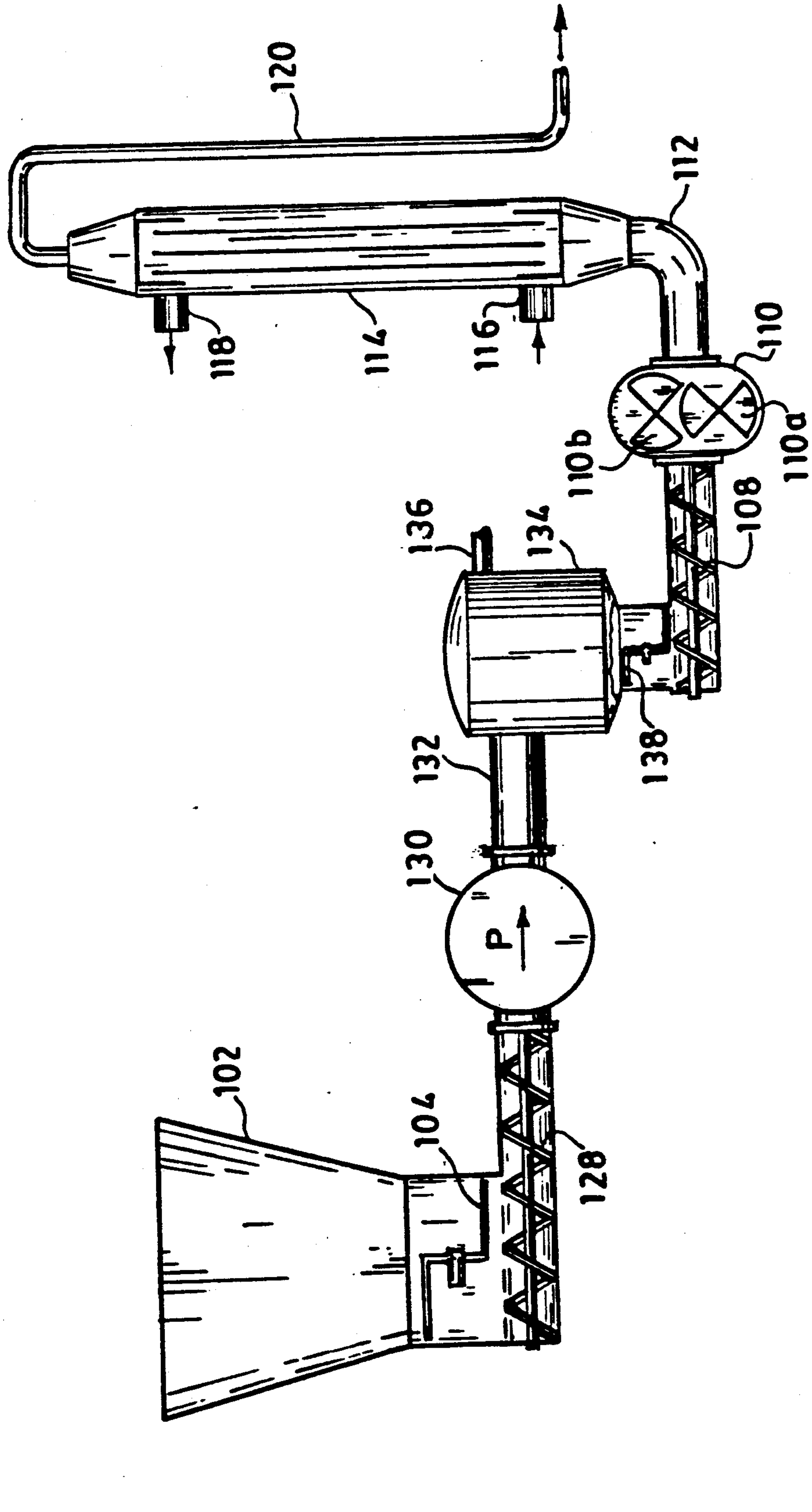
FIG. 2 is a schematic view of a continuous liquefaction system according to an alternative embodiment of the invention.

FIG. 2 depicts an alternative embodiment of the present invention. In this embodiment, chunks or grains of gelled photographic material are added to hopper 102 by any suitable method. At the bottom of hopper 102 is bridge breaker 104, which, like bridge breaker 4 in FIG. 1, sweeps over conveyor 128 to prevent material from bridging over conveyor 128 and not filling the flights of conveyor 128 with material. Gelled material is conveyed by conveyor 128, preferably a screw conveyor, to pump 130 which advances material through pipe 132 into vacuum drum 134. Vacuum drum 134 is connected to a source of vacuum by connection 136 to remove entrapped air from the material. Vacuum is preferably drawn to a range of 0 to 10 PSIA.

A continuous supply of material is then conveyed by conveyor 108, preferably a screw conveyor, to positive displacement pump 110. Conveyor 108 is positioned under bridge breaker 138, which like bridge breaker 4 in FIG. 1, prevents material from bridging over conveyor 108 and not filling the flights of conveyor 108 filled with material. Conveyor 108 advances a continuous supply of material to positive displacement pump 110 to keep the spaces swept by rotors 110*a* and 110*b* of positive displacement pump 110 continuously filled with material. Screw conveyor 108 and positive displacement pump 110 are like screw conveyor 8 and positive displacement pump 10, respectively, of FIG. 1.

Positive displacement pump 110 advances a continuous mass of material through connection line 112 into heat exchanger 114. Hot water or other suitable heat exchange fluid is supplied to heat exchanger 114 via inlet 116 and discharged from outlet 118. Material is liquefied by heating in heat exchanger 114, which is preferably of shell and tube design, to a temperature of about 32° C. to 100° C., slightly above the coating temperature of 30° C. to 55° C., preferably 40° C.

The advancement of a continuous and substantially undisrupted flow of gelled material into heat exchanger 114 by positive displacement pump 110 causes the material liquefied in heat exchanger 114 to continue advancing through conduit 120 to a substrate coating system (not shown) as a continuous mass. The substrate coating system may incorporate in-line air removal apparatus.

The above-described method of the present invention achieves a number of advantages. Because full pump flights are maintained in the positive displacement pump, the positive displacement pump advances a constant material composition throughout the remainder of the system. Significant pressure perturbations are eliminated, obviating the need for any in-line surge dampening apparatus. In addition, significantly less air is present in the liquefied material.

The overall size and hold-up volume of the continuous liquefaction apparatus are significantly decreased, making the method of the invention particularly suited to small runs. Waste of material is greatly reduced and cleaning of the apparatus is easier and faster.

Further advantages of the method of the invention will be apparent to those skilled in the art.

Although the method of the invention has been described in detail for the purpose of illustration, it is understood that such detail is solely for that purpose, and variations can be made therein by those skilled in the art without departing from the spirit and scope of the invention which is defined by the following claims.

We claim:

1. A method for continuously liquefying a gelled photographic material in granular or chunk form, comprising:

conveying said gelled photographic material in granular or chunk form to a positive displacement pump to keep said positive displacement pump filled with said material;

continuously advancing a substantially undisrupted mass of said material, with said positive displacement pump, into a heat exchanger; and liquefying said material in said heat exchanger.

2. A method as provided in claim 1, further comprising:

drawing a vacuum on said material to remove entrapped air.

3. A method as provided in claim 2, wherein said vacuum is drawn on said material before said conveying of said material to said positive displacement pump.

4. A method as provided in claim 1, wherein said conveying is carried out with a screw feeder.

5. A method as provided in claim 4, wherein said conveying is further carried out with a bridge breaker positioned above said screw feeder to prevent said material from bridging over said screw feeder and not filling the flights of said screw feeder with said material.

6. A method as provided in claim 1, wherein said material is heated in said heat exchanger to a temperature of about 32° C. to 100° C.

7. A method as provided in claim 1, wherein said material is in granular or chunk form during said conveying and said continuously advancing of said material.

8. A method as provided in claim 1, wherein said liquefied material is continuously advanced by said positive displacement pump, as a substantially undisrupted mass, to a substrate coating system.

9. A method as provided in claim 1, wherein said conveying comprises removing said material from a hopper.

10. A method for continuously liquefying a gelled photographic material in granular or chunk form, comprising:

conveying said gelled photographic material in granular or chunk form to a vacuum drum;

drawing a vacuum on said material in said vacuum drum to remove entrapped air;

conveying said material from said vacuum drum to a positive displacement pump to keep said positive displacement pump filled with said material;

continuously advancing a substantially undisrupted mass of said material, with said positive displacement pump into a heat exchanger; and liquefying said material in said heat exchanger.

11. A method as provided in claim 10, wherein said conveying said material to a vacuum drum is carried out with a screw conveyor.

12. A method as provided in claim 11, wherein said conveying said material to a vacuum drum is further carried out with a pump receiving said material from said screw conveyor.

13. A method as provided in claim 10, wherein said material is heated in said heat exchanger to a temperature of about 32° C. to 100° C.

14. A method as provided in claim 10, wherein said material is in granular or chunk form during said conveying said material from a vacuum drum and said continuously advancing.

15. A method as provided in claim 10, wherein said liquefied material is continuously advanced by said positive displacement pump, as a substantially undisrupted mass, to a substrate coating system.

16. A method as provided in claim 10, wherein said conveying said material to a vacuum drum comprises removing said material from a hopper.

17. A method for continuously liquefying a gelled photographic material in granular or chunk form, comprising:

conveying said gelled photographic material in granular or chunk form with a screw conveyor to a positive displacement pump to keep said positive displacement pump filled with said material;

continuously advancing a substantially undisrupted mass of said material, with said positive displacement pump, into a heat exchanger, wherein said material is in granular or chunk form during said conveying and said continuously advancing of said material;

liquefying said material in said heat exchanger; and continuously advancing said liquefied material with said positive displacement pump, as a substantially undisrupted mass, to a substrate coating system.

* * * * *